United States Patent [19]

Urakawa

[11] Patent Number: 5,357,378
[45] Date of Patent: Oct. 18, 1994

[54] DATA REPRODUCING APPARATUS WITH MEANS FOR DIFFERENTIATING A READ HEAD OUTPUT SIGNAL AND MEANS FOR THREE VALUE DETECTION OF THE RESULT DIFFERENTIATED

[75] Inventor: Yoshiyuki Urakawa, Kanagawa, Japan

[73] Assignee: Sony Corporation, Tokyo, Japan

[21] Appl. No.: 959,130

[22] Filed: Oct. 9, 1992

[30] Foreign Application Priority Data

Oct. 11, 1991 [JP] Japan ................. 3-292141

[51] Int. Cl.⁵ .................. G11B 5/09; H03M 5/06; H04L 25/34; H04L 25/49
[52] U.S. Cl. ........................ 360/46; 341/68; 375/17
[58] Field of Search ............. 360/40, 41, 45, 46, 360/51, 43, 66, 32, 26, 22, 31, 53; 341/56, 68, 69; 364/724; 375/76, 17; 369/54; 340/347

[56] References Cited

U.S. PATENT DOCUMENTS

| | | | |
|---|---|---|---|
| 3,927,401 | 12/1975 | McIntosh | 341/68 X |
| 4,323,931 | 4/1982 | Jacoby | 360/40 |
| 4,346,411 | 8/1982 | Buhler et al. | 360/67 X |
| 4,481,548 | 11/1984 | Yanagida | 360/44 |
| 4,482,927 | 11/1984 | Melbye et al. | 360/40 |
| 4,533,964 | 8/1985 | Owaki et al. | 360/51 X |
| 4,544,961 | 10/1985 | Chi | 360/40 |
| 4,544,963 | 10/1985 | Jacoby et al. | 360/40 |
| 4,546,393 | 10/1985 | Mori et al. | 360/40 |
| 4,566,044 | 1/1986 | Langdon et al. | 360/40 |
| 4,613,913 | 9/1986 | Phillips | 360/41 X |
| 4,618,941 | 10/1986 | Linder et al. | 360/41 X |
| 4,719,520 | 1/1988 | Isshiki | 360/66 X |
| 5,101,395 | 3/1992 | Cardero et al. | 369/59 |
| 5,130,862 | 7/1992 | Kobayashi et al. | 360/40 |
| 5,255,133 | 10/1993 | Yamamori et al. | 360/67 |

OTHER PUBLICATIONS

Cioffi et al., "Adaptive Equalization in Magnetic Disk Storage Channels" IEEE Communications Magazine, Feb. 1990, p. 20.

Primary Examiner—John Shepperd
Assistant Examiner—Patrick Wamsley
Attorney, Agent, or Firm—Hill, Steadman & Simpson

[57] ABSTRACT

A data reproducing apparatus by which data vertically magnetically recorded on a single layer film medium can be detected readily and accurately with a simple construction by means of a ring head. Upon recording, input data are NRZI converted into a recording sequence, which is vertically magnetically recorded onto a single layer film medium. The data are reproduced from the single layer film medium by means of the ring head, and the reproduction signal is differentiated. The differentiation signal is three-value detected to restore the original data.

4 Claims, 6 Drawing Sheets

| INPUT SEQUENCE | 0 0 1 1 0 0 0 1 0 |

↓ NRZI

| RECORDING SEQUENCE | 0 0 0 1 0 0 0 0 1 1 |

MEDIUM

REPRODUCTION SIGNAL

DIFFERENTIATION SIGNAL

| DETECTION SEQUENCE | 0 0 1 1 0 0 0 1 0 |

FIG. 2(a)
SIGNAL SEQUENCE
0  0  0  1  0  1  0  0
NRZI
FIG. 2(b)
RECORDING SIGNAL
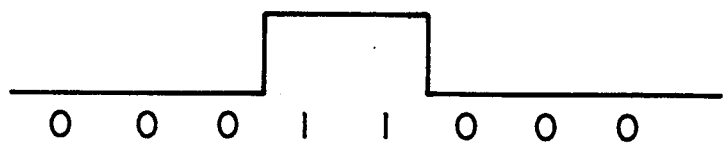
0  0  0  1  1  0  0  0
FIG. 2(c)
REPRODUCTION SIGNAL
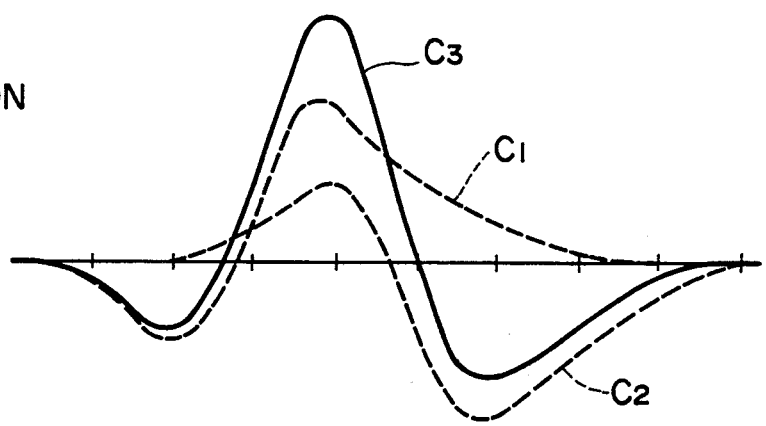
FIG. 2(d)
DIFFERENTIATION SIGNAL
THRESHOLD LEVEL
THRESHOLD LEVEL
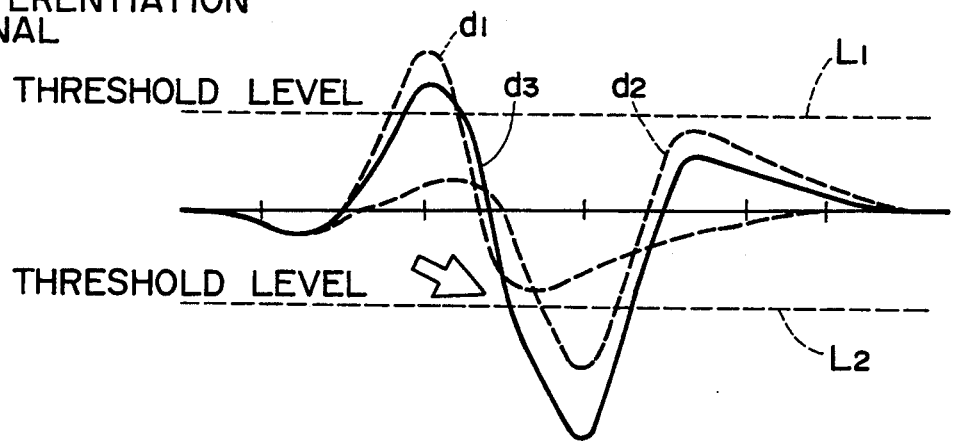
FIG. 2(e)
0  0  1  0  1  0  0  0

F I G. 3
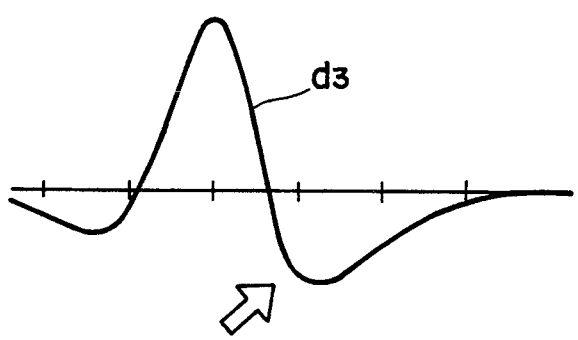
F I G. 4
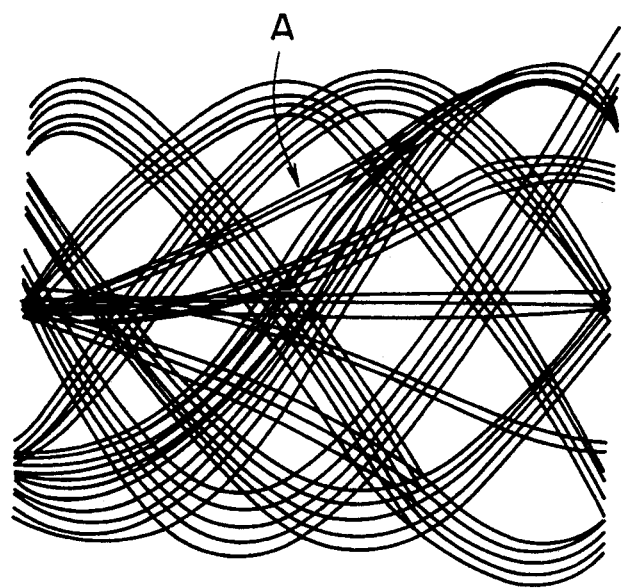
F I G. 5
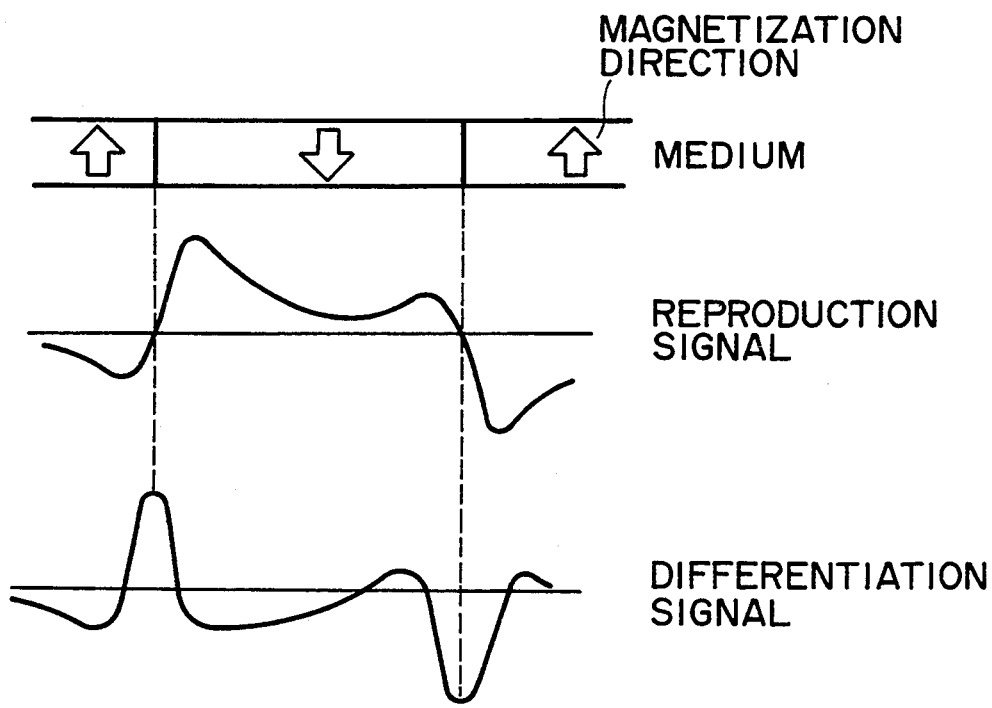

DATA REPRODUCING APPARATUS WITH MEANS FOR DIFFERENTIATING A READ HEAD OUTPUT SIGNAL AND MEANS FOR THREE VALUE DETECTION OF THE RESULT DIFFERENTIATED

BACKGROUND OF THE INVENTION

1. Field of the Invention

This invention relates to a data reproducing apparatus suitably applied to reproduce data vertically magnetically recorded on a single layer film medium by means of a ring head.

2. Description of the Related Art

Data can be recorded or reproduced vertically magnetically onto or from a single layer film medium by means of a ring head. Such recording or reproduction is illustrated in FIG. 9. Referring to FIG. 9, data are recorded in the form of vertical magnetization as shown by arrow marks, that is, vertically magnetically recorded, on a single layer film medium 52. When data vertically magnetically recorded on the single layer film medium 52 are reproduced by means of a ring head 51, if the data are isolated, then the reproduction waveform thereof exhibits such a double-humped waveform as shown in FIG. 10. In particular, the level decreases in the negative direction from the zero level and then suddenly increases, after passing a predetermined peak, in the positive direction. Then, after passing a positive peak, the level decreases to the zero level again.

Conventionally, when one detects an isolated reproduction wave having a double-humped waveform, it is supplied, for example, to a linear equalizer, a Hilbert filter or a like element to convert it into a wave having a single-humped waveform as shown in FIG. 11, and then a high frequency region of the wave thus obtained is emphasized.

However, an apparatus which converts a double-humped waveform into a single-humped waveform to detect data in this manner has a problem that it requires a large number of elements for the detection and therefore is complicated in construction. Further, when a linear equalizer is employed, it is another problem that the adjustment of the same is complicated and cumbersome.

SUMMARY OF THE INVENTION

It is an object of the present invention to provide a data reproducing apparatus which can detect data readily with a simple construction.

In order to attain the object, according to an aspect of the present invention, there is provided a data reproducing apparatus for reproducing recorded data from a single layer film medium on which the recorded data have been vertically magnetically recorded by means of a ring head, which comprises differentiating means for differentiating a signal reproduced from the single layer film medium, and detecting means for three-value detecting the differentiation signal from said differentiating means.

In the data reproducing apparatus, a signal reproduced from a single layer film medium by a ring head is differentiated by the differentiating means and then three-value detected by the detecting means. Accordingly, with the data reproducing apparatus, data can be reproduced simply, without having a complicated construction.

According to another aspect of the present invention, there is provided a data reproducing apparatus for reproducing recorded data from a single layer film medium in which the recorded data have been vertically magnetically recorded by means of a ring head, which comprises differentiating means for differentiating a signal reproduced from the single layer film medium, detecting means for detecting a logic value of the differentiation signal from said differentiating means, and correcting means for correcting, when two successive results of detection by said detecting means present the logic value 1, the first logic value to 0.

With the data reproducing apparatus, when two successive results of detection by the detecting means present the logic value 1, the first one of the logic values is corrected to 0. Consequently, detection in error is prevented, and accurate reproduction of data can be achieved.

The above and other objects, features and advantages of the present invention will become apparent from the following description and the appended claims, taken in conjunction with the accompanying drawings in which like parts or elements are denoted by like reference characters.

BRIEF DESCRIPTION OF THE PREFERRED EMBODIMENT

FIG. 1 is a diagram illustrating the principle of recording and reproduction of a data reproducing apparatus of the present invention;

FIGS. 2(a), (b), (c), (d), and (e) comprise is a diagram illustrating a process of occurrence of an inter symbol interference;

FIG. 3 is a diagram illustrating a cause of an inter symbol interference;

FIG. 4 is a diagram showing an eye pattern;

FIG. 5 is a diagram illustrating reversal of a differentiation signal;

DETAILED DESCRIPTION OF THE PREFERRED EMBODIMENT

Figure 9:
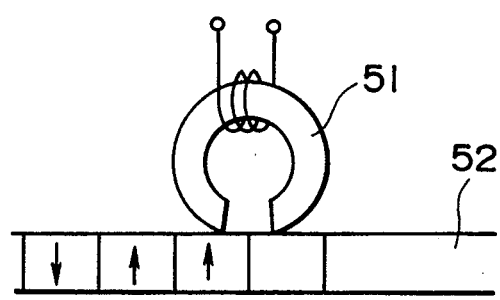
FIG. 9 is a schematic view illustrating reproduction of a vertically magnetically recorded signal.
Figure 10:
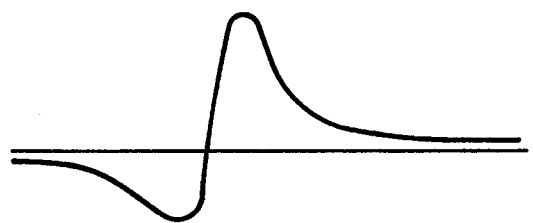
FIG. 10 is a diagram showing a reproduction waveform of an isolated reproduction wave.
Figure 11:
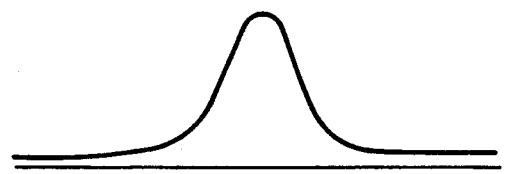
FIG. 11 is a diagram showing a single-humped waveform obtained by conversion of an isolated reproduction wave.

The present invention is applied to a data recording apparatus which reproduces data onto a single layer film medium 52 by means of a ring head 51 as shown in FIG. 9.

Figure 1:
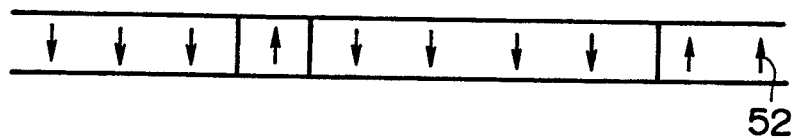
Figure 1:
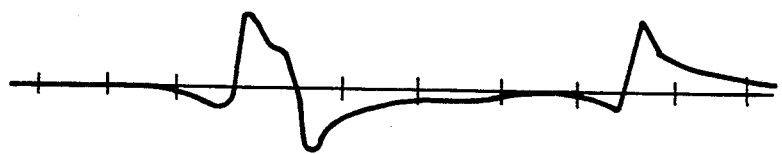
Figure 1:
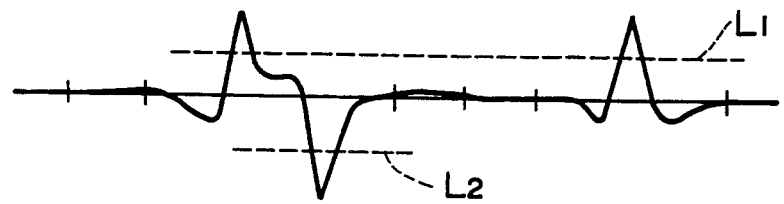

FIG. 1 illustrates the principle of recording and reproduction of the data reproducing apparatus of the present invention. Referring to FIG. 1, data to be recorded (input sequence) are first NRZI converted. In particular, the input sequence "001100010" is converted into a recording sequence of "0001000011". The recording sequence is recorded onto the single layer film medium 52 by means of the ring head 51. Here, the logic value 1 of the data of the recording sequence is vertically recorded by magnetization in the direction of an upwardly directed arrow mark while the logic value 0 is vertically recorded by magnetization in the direction of a downwardly directed arrow mark.

When the data vertically recorded on the single layer film medium 52 in this manner are reproduced by means of the ring head 51, an isolated reproduction waveform of the reproduction signal exhibits such a double-humped waveform as described hereinabove. The reproduction signal is then differentiated to form a differentiation signal. The logic value of the differentiation signal is compared with two reference levels $L_1$ and $L_2$ ($L_1 > L_2$). When the level of the differentiation signal is equal to or higher than the reference level $L_1$, the logic value is determined to be 1, but when the level is equal to or lower than the other reference level $L_2$, the logic value is determined to be $-1$, and when the level is between the reference levels $L_2$ and $L_1$, the logic value 0 is determined. If it is assumed that the logic value $-1$ is detected and processed as the logic value 1, then the detection data obtained after determination of the differentiation signal among the three values of 1, 0 and $-1$ are "001100010" as seen from FIG. 1. Thus, the detection sequence coincides with the input sequence.

When a differentiation signal is three-value detected in this manner, however, there is the possibility that a logic value may be detected in error. The reason is described subsequently.

Referring now to FIGS. 2(a), (b), (c), (d), and (e) if it is assumed that the sequence "00010100" is inputted as an input signal sequence as seen in FIG. 2(b), then the signal sequence is NRZI converted into a recording signal of "00011000" as seen in FIG. 2(b). If the recording signal is vertically recorded onto the single layer film medium 52 by means of the ring head 51 and then reproduced by means of the ring head 51 as described hereinabove, then such a reproduction waveform as shown by the waveform in FIG. 2(c) is obtained. In particular, the reproduction waveform is a composite waveform $c_3$ of two isolated reproduction waveforms $c_1$ and $c_2$ corresponding to the reversal from 0 to 1 and the reversal from 1 to 0, respectively. If the reproduction waveform $c_3$ is differentiated, then such a differentiation waveform $d_3$ as shown by FIG. 2(d) is obtained. The differentiation waveform $d_3$ is a composite of waveforms $d_1$ and $d_2$ obtained by differentiation of the reproduction waveforms $c_1$ and $c_2$, respectively.

If the differentiation waveform is three-value detected with the reference levels $L_1$ and $L_2$, then the sequence "00101000" shown in FIG. 2(e) is obtained. The probability that the logic value 0 before the second logic value 1 of the sequence is detected as the logic value 1 ($-1$) in error is high because the level of the differentiation waveform thereof is near to the reference level $L_2$. This arises from the fact that a portion of the differentiation waveform $d_3$ indicated by an arrow mark in FIG. 3 disturbs the value of an adjacent bit, that is, an inter symbol interference is caused.

This is described subsequently using an eye pattern shown in FIG. 4. Referring to FIG. 4, while a portion indicated by an arrow mark A should originally present an aperture, the portion at which an aperture should be present is crossed by a line or lines due to the inter symbol interference. Accordingly, the possibility that an error in detection may take place at the portion is high.

However, two successive reversals in magnetization must occur in the opposite directions as seen from FIG. 5. In particular, when a reversal, for example, from the logic value 1 (or the logic value 0) to the logic value 0 (or the logic value 1) takes place, another reversal takes place from the logic value 0 (or the logic value 1) to the logic value 1 (or the logic value 0). Accordingly, if a differentiation signal is three-value detected, then the logic value 1 should be succeeded by the logic value 0 or the logic value $-1$, and data before processing of replacement of 1 for $-1$ should not include successive appearances of 1 or $-1$. Accordingly, when two successive logic values present 1 or $-1$, the last logic value 1 or $-1$ is a resultant value of correct detection, but the first logic value is a resultant value of detection in error of the logic value 0. Therefore, when data are detected in error, the logic value in error is corrected to obtain correct data.

Figure 6:
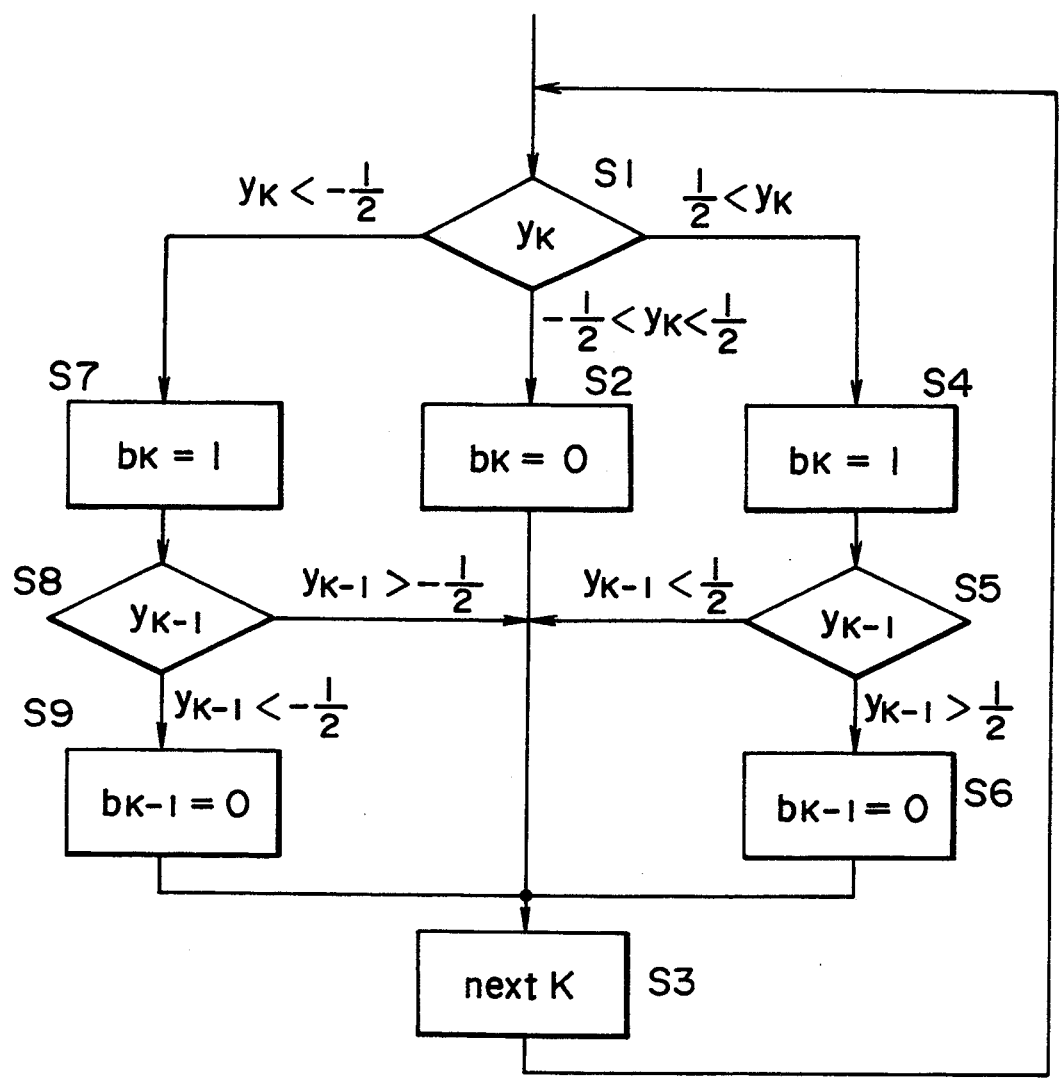
FIG. 6 is a flow chart illustrating processing for the correction of an inter symbol interference.

FIG. 6 illustrates a flow of processing steps for preventing such detection in error. Referring to FIG. 6, a logic value $y_K$ of a differentiation signal is first judged at step S1. When the logic value $y_K$ is equal to or higher than $-\frac{1}{2}$ but equal to or lower than $\frac{1}{2}$, the control sequence advances to step S2, at which the detection data $b_K$ are determined as the logic value 0. When the level $y_K$ of the differentiation signal is higher than $\frac{1}{2}$, the control sequence advances to step S4, at which the detection data $b_K$ are determined as the logic value 1. In this instance, the control sequence further advances to step S5, at which the level $y_{K-1}$ of the preceding differentiation value is judged. When the level $y_{K-1}$ is equal to or lower than $\frac{1}{2}$, the logic value of the preceding data $b_{K-1}$ is left as the logic value 1, but on the contrary when the level $y_{K-1}$ is higher than $\frac{1}{2}$, the control sequence advances to step S6, at which the detection data $b_{K-1}$ are changed to the logic value 0.

On the other hand, when it is detected at step S1 that the logic value $y_K$ is lower than $-\frac{1}{2}$, the control sequence advances to step S7, at which the detection data $b_K$ are determined as the logic value 1. In this instance, the control sequence further advances to step S8, at which the level $y_{K-1}$ is equal to or higher than $-\frac{1}{2}$, the logic value of the preceding detection data $b_{K-1}$ is left as the logic value 1, but when the level $y_{K-1}$ is lower than $-\frac{1}{2}$, the control sequence advances to step S9, at which the detection data $b_{K-1}$ are changed to the logic value 0.

After the processing at step S2, S6 or S9, the control sequence advances to step S3, at which the variable K is incremented by one, whereafter the control sequence returns to step S1 to thereafter execute similar processing repetitively.

In summary, when the logic value 1 or the logic value $-1$ appears twice successively, the first logic value is changed to zero in this manner.

Figure 7:
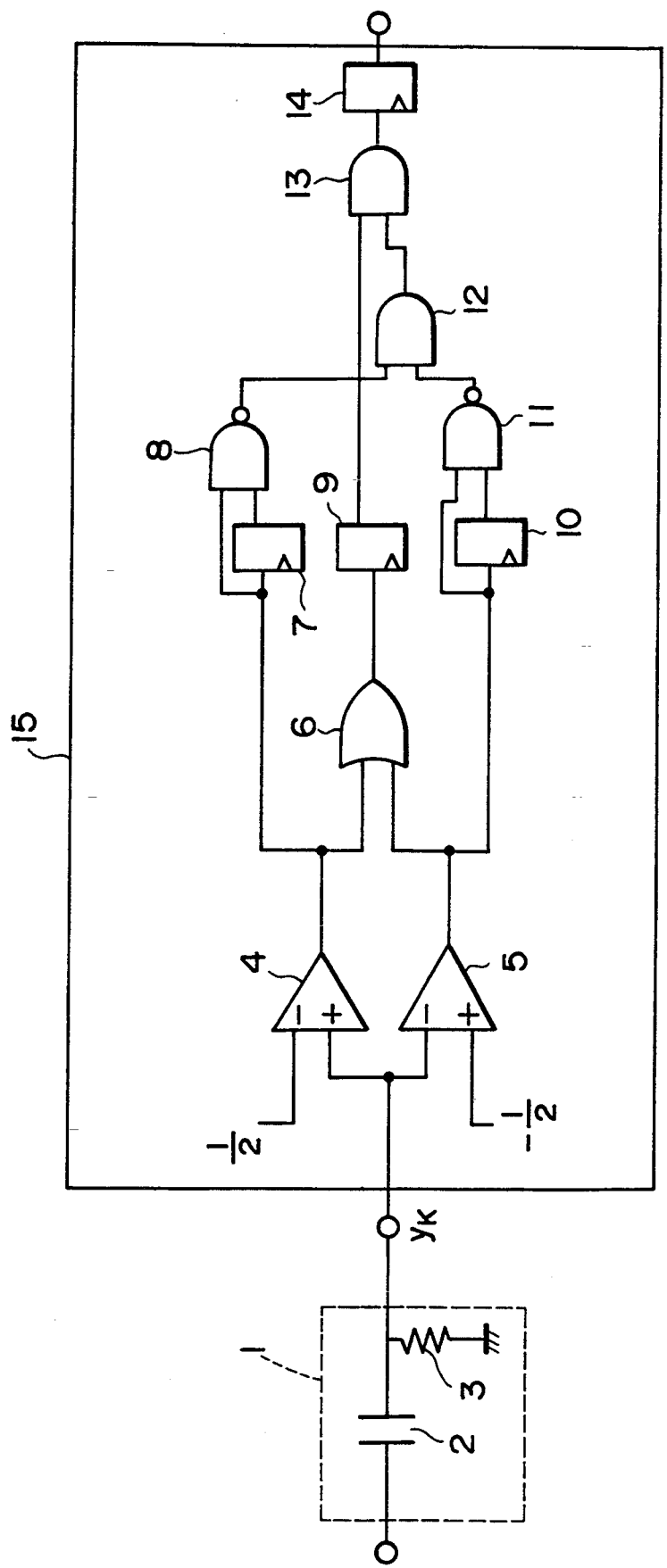
FIG. 7 is a block diagram of a data reproducing apparatus showing a preferred embodiment of the present invention.

Referring now to FIG. 7, there is shown a circuit construction of the data reproducing apparatus for executing the processing described above. The data producing apparatus of the present embodiment includes a differentiating circuit 1 and a detecting circuit 15. The differentiating circuit 1 is constituted from a capacitor 2 and a resistor 3. The detecting circuit 15 is constituted from a pair of comparators 4 and 5, an OR gate 6, four latch circuits 7, 9, 10 and 14, a pair of NAND gates 8 and 11, and a pair of AND gates 12 and 13.

In operation, a signal reproduced from the single layer film medium 52 by means of the ring head 51 in such a manner as described hereinabove is inputted to and differentiated by the differentiating circuit 1. The differentiation signal is supplied to the non-negated input terminal of the comparator 4 and the negated input terminal of the comparator 5. A reference level $\frac{1}{2}$ is supplied to the negated input terminal of the comparator 4 while another reference level $-\frac{1}{2}$ is supplied to the non-negated input terminal of the comparator 5. Accordingly, when the level of the output $y_K$ of the differentiating circuit 1 is higher than $\frac{1}{2}$, the comparator 4 outputs the logic value 1, but when the level of the output $y_K$ is equal to or lower than $\frac{1}{2}$, the comparator 4 outputs the logic value 0. Meanwhile, when the level of the output $y_K$ is lower than $-\frac{1}{2}$, the comparator 5 outputs the logic value 1, but when the level of the output $y_K$ is equal to or higher than $-\frac{1}{2}$, the comparator 5 outputs the logic value 0. Data outputted from the comparators 4 and 5 are supplied by way of the OR gate 6 to and latched by the latch circuit 9, the output of which is supplied to an input terminal of the AND gate 13.

Meanwhile, the data outputted from the comparator 4 are supplied to and latched by the latch circuit 7 and also supplied to an input terminal of the NAND gate 8. The data latched by the latch circuit 7 are supplied to the other input terminal of the NAND gate 8. Consequently, the NAND gate 8 logically ANDs a result of detection at the current clock and another result of detection at the preceding clock. Thus, when the two inputs are the logic value 1, the NAND gate 8 outputs the logic value 0. The output of the NAND gate 8 is supplied to the AND gate 12. The AND gate 12 outputs the logic value 0 when the logic value 0 is inputted thereto from the NAND gate 8. Consequently, when the NAND gate 8 outputs the logic value 0, that is, when two successive results of detection present the logic value 1, the AND gate 13, which receives at the other input terminal thereof the output of the AND gate 12, outputs the logic value 0.

Similarly, the NAND gate 11 compares data supplied thereto from the comparator 5 with data at the preceding clock latched by the latch circuit 10, and when the two inputs present the logic value 1 (both $-1$), the NAND gate 11 supplies the logic value 0 to the other input of the AND gate 12. Accordingly, in this instance, the AND gate 13 executes similar processing to that when the logic value 0 is inputted thereto from the NAND gate 8.

In particular, data of a result of detection at the preceding clock are inputted to one of the input terminals of the AND gate 13 by way of the latch circuit 9. Meanwhile, when two successive appearances of the logic value 1 are detected by the AND gate 12, the logic value 0 is inputted to the other input of the AND gate 13, but in any other case, the logic value 1 is supplied to the other input of the AND gate 13. Accordingly, when the logic value 1 ($-1$) is detected twice successively, the AND gate 13 changes the data latched by the latch circuit 9 to the logic value 0 and outputs the thus changed logic value 0 to the latch circuit 14. On the other hand, when two successive results of detection are a combination of the logic value 0 and the logic value 1, the output of the AND gate 12 presents the logic value 1, and consequently, the AND gate 13 outputs the data latched by the latch circuit 9 as they are to the latch circuit 14. As a result, data obtained by correction of data detected in error are outputted from the latch circuit 14.

Figure 8:
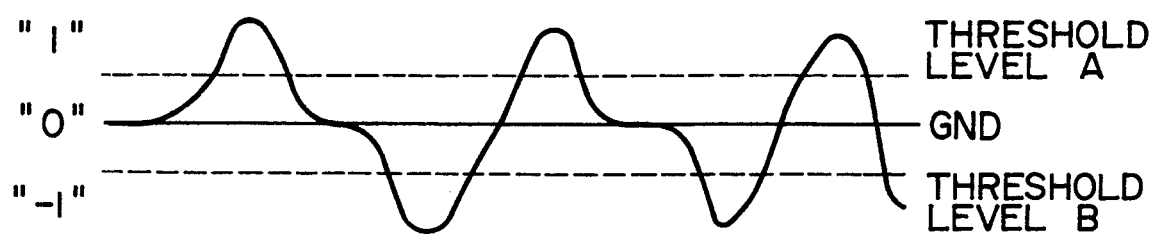
FIG. 8 is a diagram illustrating three-value detection.

In this manner, results of detection of a differentiation signal with the three values of 0, 1 and $-1$ are obtained as shown in FIG. 8.

Having now fully described the invention, it will be apparent to one of ordinary skill in the art that many changes and modifications can be made thereto without departing from the spirit and scope of the invention as set forth herein.

What is claimed is:

1. A data reproducing apparatus for reproducing binary recorded data from a single layer film medium on which the recorded data have been vertically magnetically recorded by means of a ring head, comprising:
   differentiating means for differentiating a signal reproduced by a ring head from the single layer film medium; and
   detecting means for three-value detecting the differentiation signal from said differentiating means.

2. A data reproducing binary apparatus for reproducing recorded data from a single layer film medium in which the recorded data have been vertically magnetically recorded by means of a ring head, comprising:
   differentiating means for differentiating a signal reproduced by a ring head from the single layer film medium;
   detecting means for detecting a logic value of the differentiation signal from said differentiating means; and
   correcting means for correction, when two successive results of detection of first and second successive logic values by said detecting means present the logic value 1, the first logic value to 0.

3. A data reproducing apparatus as claimed in claim 2, further comprising storage means for temporarily storing therein the differentiation signal from said differentiating means at least for one clock period, said detecting means comparing the differentiation signal from said differentiating means with the signal stored in said storage means.

4. A data reproducing apparatus as claimed in claim 3, wherein said detecting means includes means for three-value detecting the signals from said differentiating means and said storage means and compares the thus three-value detected signals.

* * * * *